(12) United States Patent
Mattmann

(10) Patent No.: US 7,043,995 B2
(45) Date of Patent: May 16, 2006

(54) PRESSURE SENSOR WITH MEMBRANE AND MEASURING ELEMENTS ARRANGED ON THE MEMBRANE

(75) Inventor: Erich Mattmann, Heidesheim (DE)

(73) Assignee: Siemens Aktiengesellschaft, München (DE)

( * ) Notice: Subject to any disclaimer, the term of this patent is extended or adjusted under 35 U.S.C. 154(b) by 56 days.

(21) Appl. No.: 10/813,978

(22) Filed: Mar. 31, 2004

(65) Prior Publication Data
US 2004/0237659 A1 Dec. 2, 2004

(30) Foreign Application Priority Data
Apr. 1, 2003 (DE) ................. 103 14 910

(51) Int. Cl.
*G01L 7/08* (2006.01)
(52) U.S. Cl. .................. 73/715; 73/717; 73/753
(58) Field of Classification Search ........... 73/700–756
See application file for complete search history.

(56) References Cited

U.S. PATENT DOCUMENTS

| | | | | |
|---|---|---|---|---|
| 4,019,388 A | * | 4/1977 | Hall et al. | 73/754 |
| 4,691,574 A | * | 9/1987 | Delatorre | 73/708 |
| 4,726,232 A | * | 2/1988 | Koneval | 73/708 |
| 4,768,011 A | | 8/1988 | Hattori et al. | |
| 5,186,055 A | * | 2/1993 | Kovacich et al. | 73/727 |
| 5,231,301 A | * | 7/1993 | Peterson et al. | 257/419 |
| 5,542,300 A | * | 8/1996 | Lee | 73/724 |
| 5,683,594 A | * | 11/1997 | Hocker et al. | 438/53 |
| 5,867,886 A | * | 2/1999 | Ratell et al. | 29/595 |
| 5,898,359 A | | 4/1999 | Ellis | |
| 6,308,574 B1 | * | 10/2001 | Klun et al. | 73/706 |
| 6,848,318 B1 | * | 2/2005 | Gerst et al. | 73/715 |

FOREIGN PATENT DOCUMENTS

| | | |
|---|---|---|
| EP | 0 751 385 A2 | 1/1997 |
| EP | 0 911 623 A2 | 4/1999 |
| JP | 63 298128 | 12/1988 |

* cited by examiner

*Primary Examiner*—Max Noori
*Assistant Examiner*—Jermaine Jenkins
(74) *Attorney, Agent, or Firm*—Cohen, Pontani, Lieberman & Pavane

(57) ABSTRACT

A pressure sensor includes a membrane having a radially peripheral edge region fixedly arranged on a support. One side of the membrane can be acted on by a medium being measured and the membrane can be deflected in response to pressure of the medium. Measuring elements and an electric circuit interconnecting the measuring elements are arranged on the membrane, the measuring elements and the circuit being applied by the thick-film technique and sintered on in a thermal process. The membrane is made of an electrically conducting metal and bears an insulating layer, on which the measuring elements and the electric circuit are arranged. In this case, the insulating layer consists of a material having a coefficient of expansion that lies between the coefficient of expansion of the metal of the membrane and the coefficient of expansion of the material of the measuring elements and the electric circuit.

18 Claims, 1 Drawing Sheet

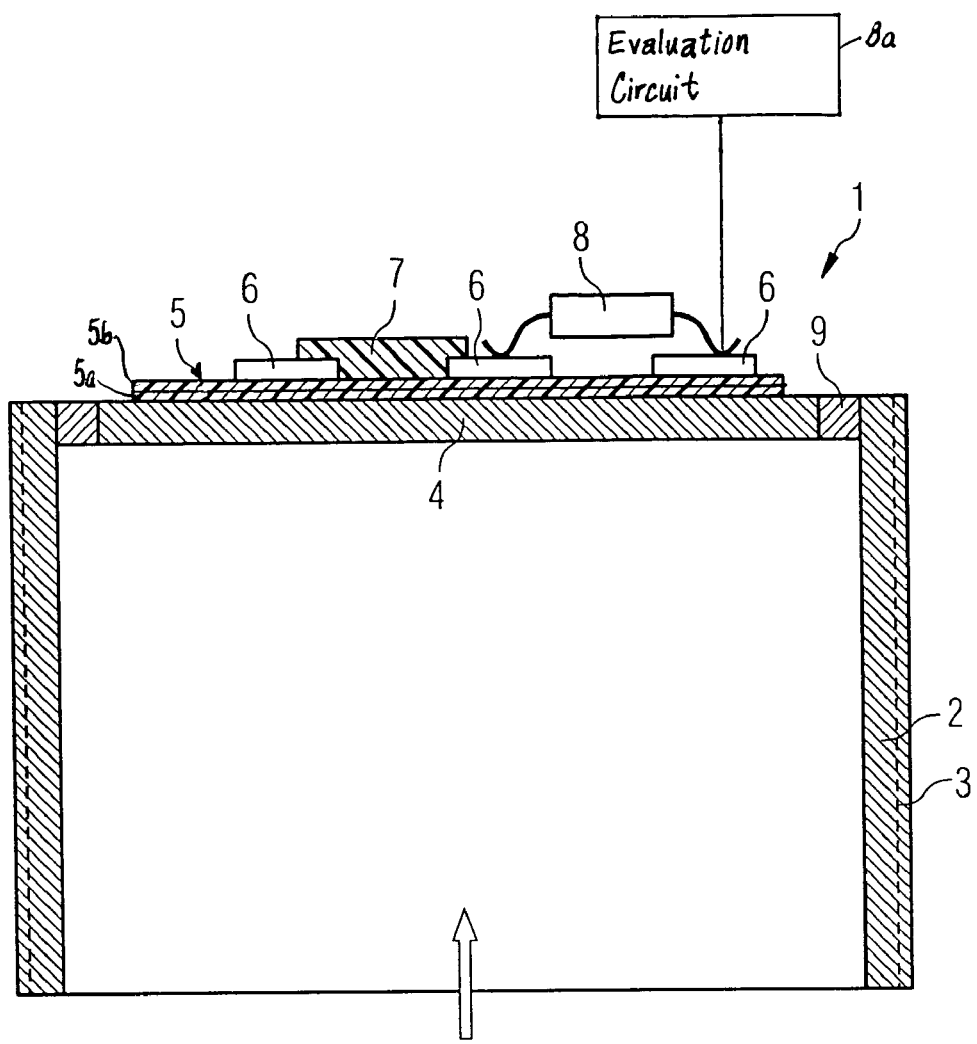

PRESSURE SENSOR WITH MEMBRANE AND MEASURING ELEMENTS ARRANGED ON THE MEMBRANE

BACKGROUND OF THE INVENTION

1. Field of the Invention

The invention relates to a pressure sensor with a membrane, measuring elements arranged on the membrane and an electric circuit interconnecting the measuring elements, wherein the membrane has a radially peripheral edge region arranged at a fixed position and one side of the membrane is exposed to a medium being measured such that the membrane is deflectable, the measuring elements and the circuit being applied by the thick-film technique and sintered on in a thermal process.

2. Description of the Related Art

Such known pressure sensors have a membrane made of ceramic, onto which a thick-film circuit is printed and sintered on in the form of a Wheatstone measuring bridge, and resistors forming the measuring elements are connected to the measuring bridge. The blanks of the membrane are produced from cast ceramic material and are very expensive. The further production of the pressure sensors with the membrane blanks is likewise cost-intensive, since to a great extent it is only possible as one-off production.

The membranes form inserts for inserting into the sensor housing and subsequent mechanical screwing in the sensor housing. Consequently, it is only possible with difficulty for the membranes to be arranged close together in the sensor housings.

SUMMARY OF THE INVENTION

An object of the present invention is to provide a pressure sensor with a membrane, measuring elements arranged on the membrane and an electric circuit interconnecting the measuring elements, which can be produced in a simple and low-cost way and which allows the membranes to be arranged close together in the sensor housing.

The object is achieved according to the present invention by a membrane made of an electrically conducting metal and bearing an insulating layer, on which the measuring elements and the electric circuit are arranged. The insulating layer includes a material of which the coefficient of expansion lies between the coefficient of expansion of the metal of the membrane and the coefficient of expansion of the material of the measuring elements and the electric circuit.

Forming the membrane from a metal allows the pressure sensor to be used for a large number of liquid and gaseous media of which the pressure is to be measured. Production and processing of such membranes is possible in particular on a large scale and in such a way that they can be joined together in a low-cost and simple way.

Furthermore, such pressure sensors are also well suited for relatively high pressures to be measured such as, for example, 2000 bar.

The insulating layer prevents a short-circuit from occurring between the parts arranged on the electrically conductive membrane.

Furthermore, the use of an insulating layer made of a material having a coefficient of expansion which lies between the coefficient of expansion of the metal of the membrane and the coefficient of expansion of the material of the measuring elements and the electric circuit avoids detachment of the measuring elements and strip conductors when the pressure sensor is subjected to varying temperatures. This allows the pressure sensor to be used well for measuring the pressure of warm or hot media.

The electric circuit interconnecting the measuring elements preferably forms a Wheatstone measuring bridge, it being possible for the measuring elements to be strain gages.

If a number of insulating layers lying one on top of the other are arranged on the membrane, and if the insulating layer lying furthest away from the membrane bears the measuring elements and the circuit, the coefficients of expansion of the material of the insulating layers lying between the coefficient of expansion of the metal of the membrane and the coefficient of expansion of the material of the measuring elements and the electric circuit, detachment is avoided even when there are very different coefficients of expansion of the materials of the membrane and of the measuring elements and the electric circuit.

In this case, the coefficients of expansion of the materials of the insulating layers are preferably such that they increase in stages, and the insulating layer with a coefficient of expansion closer to that of the metal of the membrane is arranged closer to the membrane and the insulating layer with a coefficient of expansion closer to that of the measuring elements and the electric circuit is arranged further away from the membrane.

It is also possible, however, for the coefficients of expansion of a number of insulating layers to be equal.

Insulating layers which contain barium titanate are particularly suitable.

Insensitivity even to aggressive media to be measured, such as $CO_2$ for example, is achieved if the membrane is a stainless steel membrane.

If in this case the stainless steel membrane comprises a stainless steel sheet with a thickness of approximately 0.1 mm to 0.6 mm, the sensitivity of the pressure sensor also remains very high.

A simple production process is obtained if the insulating layers consist of a dielectric paste which is printed onto the membrane or a lower insulating layer and is fired in a thermal process.

Efficient production is achieved if one or more insulating layers and/or the electric circuit and/or the measuring elements are fired in a joint thermal process.

If a number of layer systems comprising insulating layers, measuring elements and an electric circuit are applied to a sheet of a relatively large surface area and fired in a thermal process, and the individual membranes are cut out or punched out individually, for example by means of a laser, easy producibility as multiple repeats is achieved in a simple way.

An easy-to-assemble module is obtained if electrical and/or electronic components of an evaluation unit which is connected to the electric circuit and preferably has electronic integrated circuits are arranged on the side of the membrane bearing the electric circuit and the measuring elements.

In this case, the evaluation circuit may have electronic components designed as surface mounted device (SMD) components.

Even in the case of high pressures of the medium to be measured, an impermeability of the pressure sensor is achieved if the membrane is welded at its radially peripheral edge region to a support component of the pressure sensor.

In this case, the membrane may be welded at its radially peripheral edge region to a sleeve to form a pressure cell, which can be fitted into the housing of the pressure sensor in an easy-to-assemble manner if the pressure cell is provided with a thread on its inner or outer cylindrical surface.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing is a cross sectional view of a pressure cell of a pressure sensor according to an embodiment of the present invention.

DETAILED DESCRIPTION OF THE PRESENTLY PREFERRED EMBODIMENTS

The drawing shows a pressure cell 1 which comprises a cylindrical sleeve 2 made of stainless steel and having a thread 3 arranged on its outer cylindrical surface.

One end of the sleeve 2 is closed by a membrane 4 made of stainless steel. A radially peripheral edge region 9 of the membrane 4 is welded, preferably by laser welding, to a radially peripheral end region of the sleeve 2. The membrane 4 has a thickness of, for example, 0.2 mm. Alternatively, the membrane thickness may be 0.1 mm to 0.6 mm.

The laser welding has the effect that the membrane 4 remains free from stress to the greatest extent, minimizing the occurrences of falsifications of the measured values of the pressure sensor which can be caused by thermal stresses. Furthermore, laser welding allows even a membrane of small thickness to be adequately welded.

Arranged on the outer surface of the membrane 4 is an insulating layer 5, which may include a plurality of insulating layers lying one on top of the other.

Strip conductors 6 of an electric circuit, measuring resistors 7 formed as strain gages and electronic components 8 of an evaluation circuit 8a are arranged on the insulating layer 5, which has an electrically insulating effect. The strip conductors 6 of the electric circuit connect the measuring resistors 7 to form a Wheatstone bridge, the output signal of which can be fed to the evaluation circuit.

The insulating layer 5 is printed onto the membrane 4 as a dielectric paste. After that, the strip conductors 6 and measuring resistors 7 are applied, likewise as paste printing. In a joint thermal process, the insulating layer 5, the strip conductors 6 and measuring resistors 7 are then sintered on. Subsequently, the electronic components 8 of the evaluation circuit, which may comprise surface mounted devices, are soldered on.

The coefficient of expansion of the material of the insulating layer 5 lies between that of the stainless steel of the membrane 4 and that of the materials of the measuring resistors 7 and the strip conductors 6. The insulating layer 5 may comprise a plurality of layers 5a, 5b, wherein each of the layers 5a, 5b has a different coefficient of expansion. For example, the coefficient of layer 5a may be closer to the coefficient of expansion of the membrane 4 than that of layer 5b. Alternatively, a plurality of the layers may have the same coefficient of expansion.

After the pressure cell 1 has been screwed by its thread into a corresponding clearance in a sensor housing (not shown) and the end of the sleeve 2 lying opposite from the membrane 4 has been closed, the interior of the pressure cell 1 forms a chamber which can be acted on by the medium of which the pressure is to be measured.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure sensor, comprising:
a support;
a membrane having first and second opposing sides and a radially peripheral edge region, said membrane being made of an electrical conducting metal, said radially peripheral edge region being fixed relative to said support, and one of said first and second opposing sides being arranged for facing a medium such that the membrane is deflective relative to the pressure of the medium;
an insulating layer having a first side and a second side, wherein said first side of said insulating layer is arranged on said membrane; and
measuring elements and an electric circuit interconnecting said measuring elements being applied on said second side of said insulating layer by a thick-film technique and sintered onto said second side by a thermal process, said measuring elements and said electric circuit being arranged for determining the pressure of the medium, said insulating layer consisting of a material having a coefficient of expansion that lies between the coefficient of expansion of said metal of said membrane and the coefficient of expansion of said measuring elements and said electric circuit.

2. The pressure sensor of claim 1, wherein said electric circuit interconnecting said measuring elements forms a Wheatstone measuring bridge.

3. The pressure sensor of claim 2, wherein said measuring elements are strain gages.

4. The pressure sensor of claim 1, wherein said insulating layer comprises a plurality of layers lying one on top of the other arranged on said membrane, wherein the one of said plural layers lying furthest away from said membrane bears said measuring elements and said electric circuit, wherein each of said plural layers has a coefficient of expansion which lies between the coefficient of expansion of said metal of said membrane and the coefficient of expansion of said measuring elements and said electric circuit.

5. The pressure sensor of claim 4, wherein the coefficients of expansion of the materials of said plural layers are such that they increase in stages, and the one of said plural layers closest to said membrane has a coefficient of expansion closer to that of said membrane than the coefficient of expansion of others of said layers that are further away from said membrane.

6. The pressure sensor of claim 4, wherein the coefficients of expansion of at least some of said plural layers are equal.

7. The pressure sensor of claim 4, wherein each of said plural layers consists of a dielectric paste printed onto said membrane or a lower one of said plural layers and is fired in a thermal process.

8. The pressure sensor of claim 7, wherein at least two of said electric circuit, said measuring elements, and one of said plural layers are fired in a joint thermal process.

9. The pressure sensor of claim 1, wherein said membrane comprises a stainless steel membrane.

10. The pressure sensor of claim 9, wherein said stainless steel membrane comprises a stainless steel sheet having a thickness of approximately 0.1 mm to 0.6 mm.

11. The pressure sensor of claim 1, wherein said insulating layer consists of a dielectric paste printed onto said membrane and fired in a thermal process.

12. The pressure sensor of claim 11, wherein at least two of said electric circuit, said measuring elements, and said insulating layer are fired in a joint thermal process.

13. The pressure sensor of claim 1, further comprising one of electrical and electronic components of an evaluation unit connected to said electric circuit and arranged on the side of said membrane bearing said measuring elements and said electric circuit.

14. The pressure sensor of claim 13, wherein said evaluation circuit includes electronic integrated circuits.

15. The pressure sensor of claim 13, wherein said evaluation circuit has electronic components designed as surface mount device components.

16. The pressure sensor of claim 1, wherein said radially peripheral edge region of said membrane is welded to said support.

17. The pressure sensor of claim 16, wherein said support comprises a sleeve, said membrane and said sleeve forming a pressure cell.

18. The pressure sensor of claim 17, wherein said pressure cell comprises a thread on one of an inner and outer cylindrical surface.

* * * * *